United States Patent [19]

Schneiter et al.

[11] Patent Number: 4,963,017

[45] Date of Patent: Oct. 16, 1990

[54] VARIABLE DEPTH RANGE CAMERA

[75] Inventors: John L. Schneiter, Latham; Nelson R. Corby, Jr., Scotia, both of N.Y.

[73] Assignee: General Electric Company, Schenectady, N.Y.

[21] Appl. No.: 345,750

[22] Filed: May 1, 1989

[51] Int. Cl.$^5$ ............................................. G01C 3/08
[52] U.S. Cl. ...................................... 356/1; 354/403; 356/4
[58] Field of Search .......................................... 354/403

[56] References Cited

U.S. PATENT DOCUMENTS

| | | | |
|---|---|---|---|
| 4,269,512 | 5/1981 | Nosler | 356/375 |
| 4,373,805 | 2/1983 | Mallinson | 356/4 |
| 4,453,083 | 6/1984 | Bohländer et al. | 250/561 |
| 4,494,868 | 1/1985 | Lambeth | 356/1 |
| 4,830,485 | 5/1989 | Penney et al. | |

OTHER PUBLICATIONS

SPSE Handbook of Photographic Science and Engineering, ed. W. Thomas, Jr., 1973, John Wiley & Sons, pp. 181–185.

*Primary Examiner*—Thomas H. Tarcza
*Assistant Examiner*—Linda J. Wallace
*Attorney, Agent, or Firm*—John S. Beulick; James C. Davis, Jr.; Paul R. Webb, II

[57] ABSTRACT

A variable depth triangulation ranging system is reconfigurable in real time in the sense that any two of the three performance measures, standoff distance, depth of field, and range resolution at a point within the depth of field, are selected by the user and the system geometrically reconfigures itself to provide the requested performance. The system is composed of a light beam emitting component such as a laser, a linear photodetector, and an imaging lens component. Any of these components has a fixed location and the other two are movable and positioned so that the Scheimpflug condition to guarantee blur-free imaging of reflected target returns is satisfied; the laser beam, a plane axis through the imaging lens component, and an image line through the photodetector all intersect at a common point. A scanner assembly is added to scan the laser beam along a line and over an area.

22 Claims, 10 Drawing Sheets

SCHEIMPFLUG CONDITION

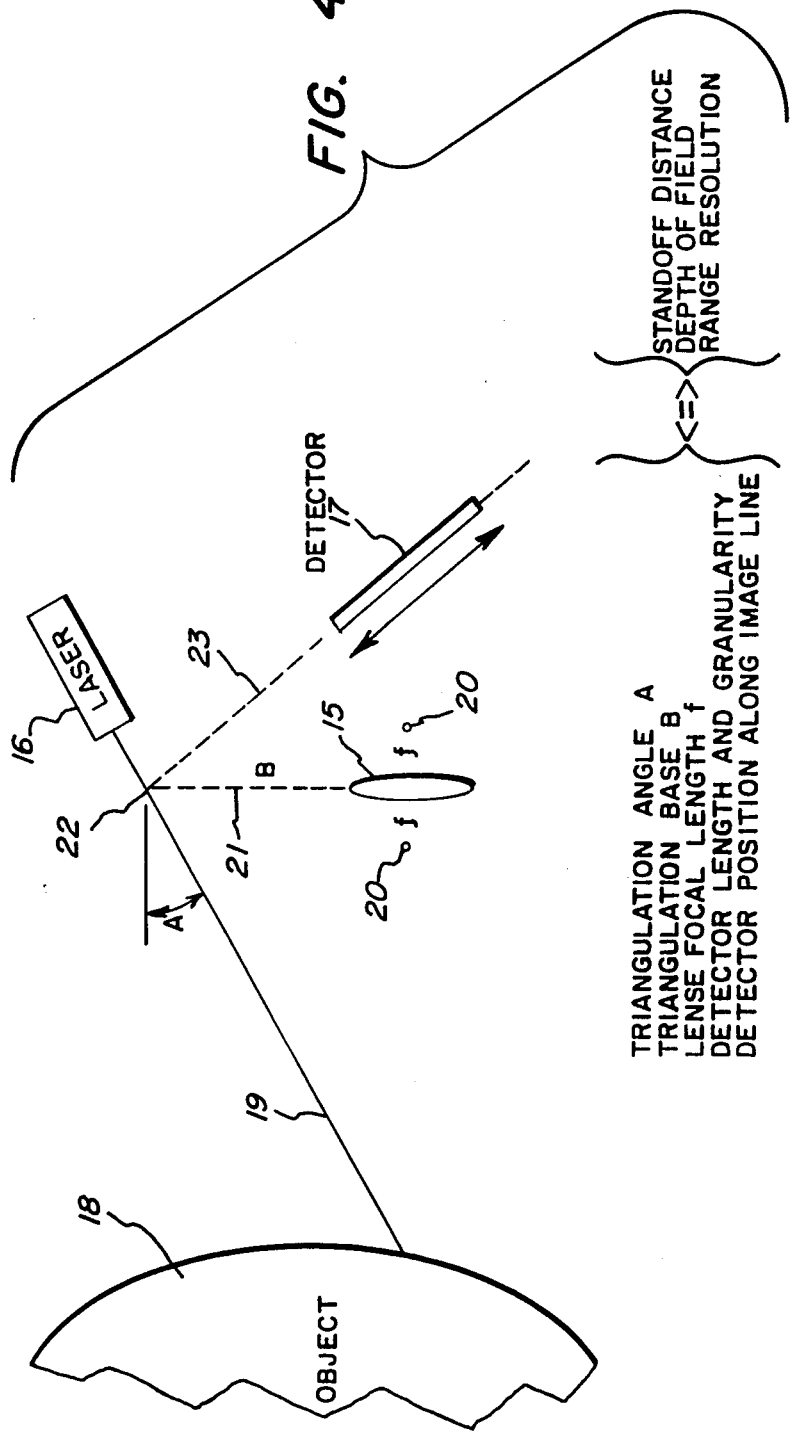

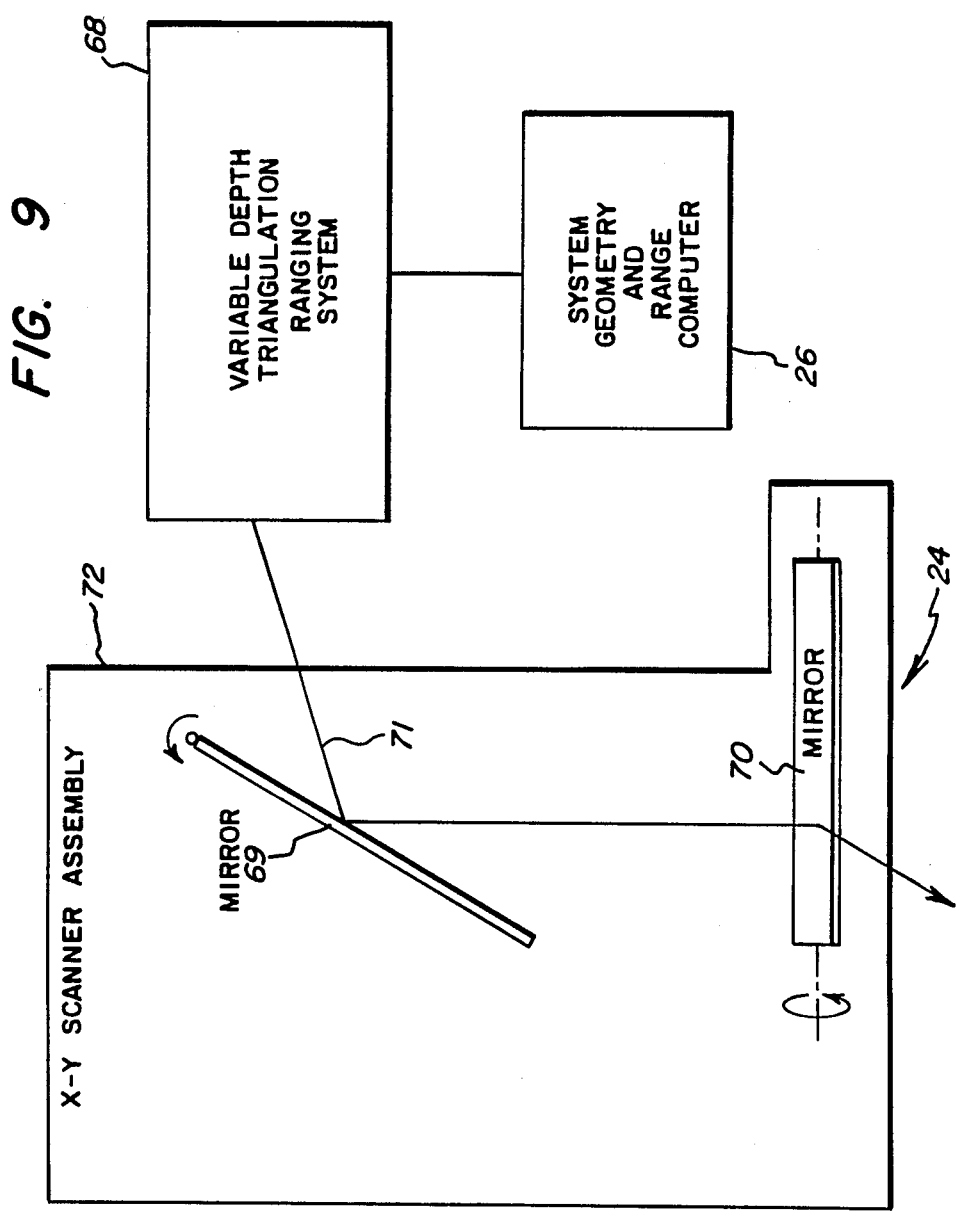

VARIABLE DEPTH RANGE CAMERA

BACKGROUND OF THE INVENTION

This invention relates to an optical triangulation ranging system, and more particularly to a non-contact sensor and camera system that has a variable geometry and is reconfigurable in real time to provide a requested performance.

Range from a reference point or plane to a given target point can be measured in a variety of ways. Passive techniques, such as stereo or range-from-focus, require illuminated target surfaces and typically require complexly patterned surfaces for reliable results. Active echoing techniques, such as RADAR, SONAR and LIDAR employ emitted electromagnetic, acoustic, and light energy, and monitor the reflected energy from the target surface. These techniques use a time-of-flight measurement as a basis for determining range, and are typically electronically expensive and complex. In machine vision research and application, a different active technique called structured illumination has been employed. A ray of light is directed to the target surface along a direction which is not coaxial with the optic axis of the one or two dimensional sensing device. The intersection of the ray and target surface produces a spot of light which is imaged on the sensing plane of the imaging device. The 3-D position of this spot in space may be calculated from the known position and orientation of the imaging device from basic trigonometric relations. This structured illumination technique is called triangulation.

Simple laser triangulation devices have proliferated in recent years and behave nominally as shown in FIGS. 1a and 1b. With the geometry of these figures, where a laser 10, lens 11, detector 12 and object 13 are illustrated, the reflected spot is imaged higher on the detector 12 as the target surface moves farther from the imaging lens. In most practical devices using this geometry, however, the reflected spot is in focus for only one target distance and is blurred in varying degrees for all other distances in the depth of field as shown in FIGS. 2a and 2b. This has the effect of reducing the sensitivity of the device and effectively reduces the depth of field.

Three of the basic performance measures of a ranging system are standoff distance, depth of field, and range resolution. The standoff distance is the nominal range of the device and is typically arbitrarily chosen as the near point, mid point or far point in the depth of field, which is the full extent of range values the system is capable of measuring. The resolution is the smallest range value the system can discriminate, and typically varies over the depth of field. Triangulation devices are engineered for a certain standoff distance, depth of field, and range resolution. That is, the geometry of the devices is chosen based on the application, and desired changes in performance require changing the imaging optics. In certain applications, such as imaging in remote areas, such inflexibility is unacceptable.

The first problem to be solved is how to provide blur-free imaging on the detector, so that all reflected target returns are in focus. The second problem is how to construct a sensor that is reconfigurable in the sense that standoff distance, depth of field, and/or range resolution can be varied under electronic control without requiring the replacement of components.

It is well known in the photographic industry that tilting the camera at the moment of exposure leads to an effect called keystoning, in which parallel lines in the subject appear as converging lines in the result. This can be rectified during printing by tilting the enlarger easel by the same angle by which the camera is tilted. To achieve sharp imagery throughout the result, the enlarger lens must also be tilted slightly, so that the planes of the lens, easel, and negative all meet at a common location, in accordance with what is known as the Scheimpflug condition in optics. The Scheimpflug condition can also be interpreted in an alternative way: a line on the object side of the lens is imaged to a line on the image side of the lens, and the two lines intersect with the line representing the plane of the lens, as shown in FIG. 3a. If the ray of light for the system is directed along some line on the object side of the lens, then we should place the detector along the Scheimpflug condition - predicted line on the image side to guarantee blur-free imaging of reflected target returns as shown in FIG. 3b.

SUMMARY OF THE INVENTION

An object of the invention is to provide a simple, inexpensive, robust sensor/camera system for measuring the range from the sensor to each of many target points.

Another object is the provision of a variable geometry, reconfigurable triangulation ranging system that allows for continuous variation in standoff distance, depth of field and range resolution.

Yet another object is to provide an improved sensor/camera system that exploits satisfaction of the Scheimpflug condition for triangulation ranging to prevent performance degradation.

Still another object is to determine the requisite geometry of the components of such a system to achieve chosen performance objectives.

The three system parameters, standoff distance, depth of field, and range resolution, can be calculated if the geometry of the triangulation ranging system is known as well as information about the imaging lens and detector. Conversely, any two of these three performances measures may be selected and the system geometry can be determined, given a specific imaging lens and detector. Providing the mechanical degrees of freedom in such a sensor package results in a reconfigurable system capable of a wide range of performance measures without requiring the replacement of the physical components.

The variable depth triangulation ranging system of this invention has a light beam emitting component to generate and direct a light ray toward an object, a photodetector component capable of measuring distance along a single axis, i.e. a linear photodetector, and an imaging lens component for imaging light reflected off of the object onto the detector. An image line is defined that extends longitudinally through the photodetector, and a plane axis that passes through the lens component. One of the three system components is at a fixed location, and means are provided for adjustably positioning the other two components such that the light beam, plane axis and image line all intersect approximately at a common point and satisfy the Scheimpflug condition to assure blur-free imaging of target returns. The two movable components are reconfigurable whereby the values of any two performance parameters selected from the group consisting of standoff distance, depth of field, and range resolution at a point within the depth of field, may be chosen and the system geometry changed to achieve those values. There are means to calculate system geometry, and range from received detector signals. A scanner may be provided to scan the light beam along a line or over an area. Typically the light source is a laser, and the photodetector is a lateral effect photodiode, linear array sensor or lateral effect photomultiplier.

Three embodiments of the reconfigurable ranging system are described. In the first embodiment the imaging lens component has a fixed location. The light beam emitting assembly is comprised of a laser and a variable orientation mirror to reflect the laser beam toward the object at a selected triangulation angle, and the assembly is mounted for linear movement to adjust the system triangulation base. The photodetector is mounted for rotational and linear movement to change the angle of the image line and the location of the photodetector along the image line. The second embodiment has a fixed location laser beam emitting component. The imaging lens component is movable to change the angle of the plane axis and its position along the plane axis, and the photodetector is adjustable to change the angle of the image line and its position along the image line. The third embodiment has the photodetector at a fixed location. The laser beam emitting component is movable to change the angle of the laser beam and its distance from the photodetector measured along the image line. The imaging lens component is movable to change the angle of the plane axis and its position along the plane axis.

The invention provides a simple, inexpensive, robust way of obtaining range data for a variety of applications. The ability to vary the standoff distance, depth of field, and resolution interactively allows the user a great deal of flexibility with a single sensor system.

BRIEF DESCRIPTION OF THE DRAWINGS

FIG. 4 shows a triangulation ranging system that satisfies the Scheimpflug condition and the known system parameters from which standoff distance, depth of field, and range resolution are calculated and vice versa.

FIG. 9 illustrates an X-Y scanner assembly usable with any of the foregoing reconfigurable ranging systems.

DETAILED DESCRIPTION OF THE INVENTION

Figure 1A:
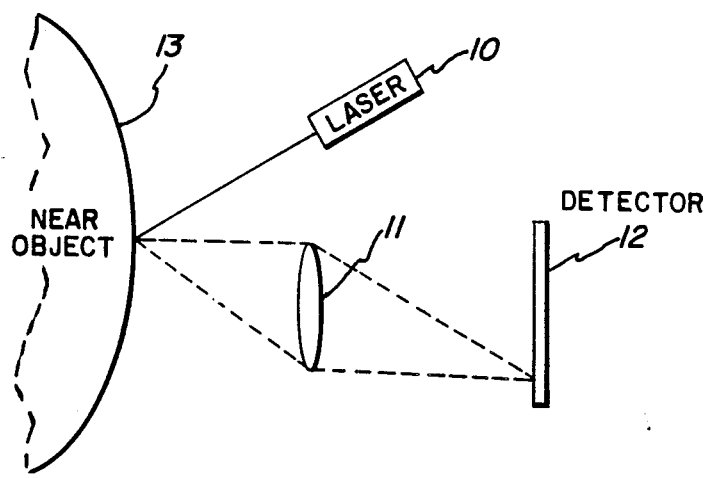
FIGS. 1a and 1b (prior art) illustrate the nominal behavior of a standard single point triangulation system measuring range to near and far objects.
Figure 1B:
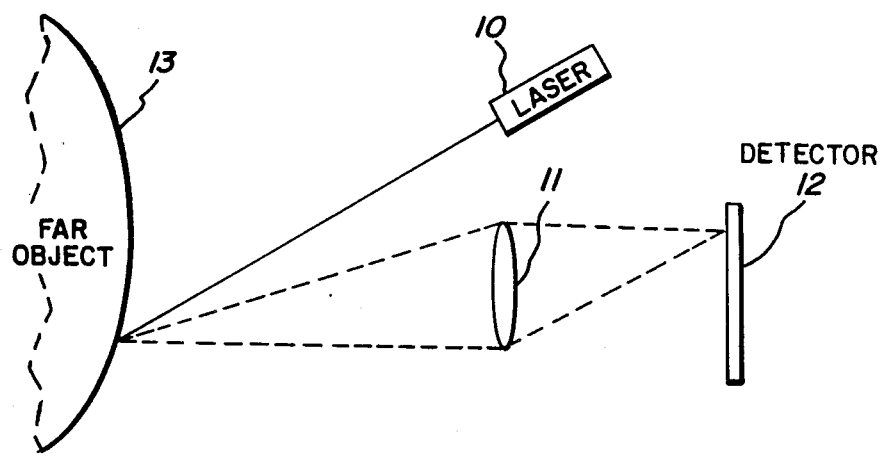
Figure 2A:
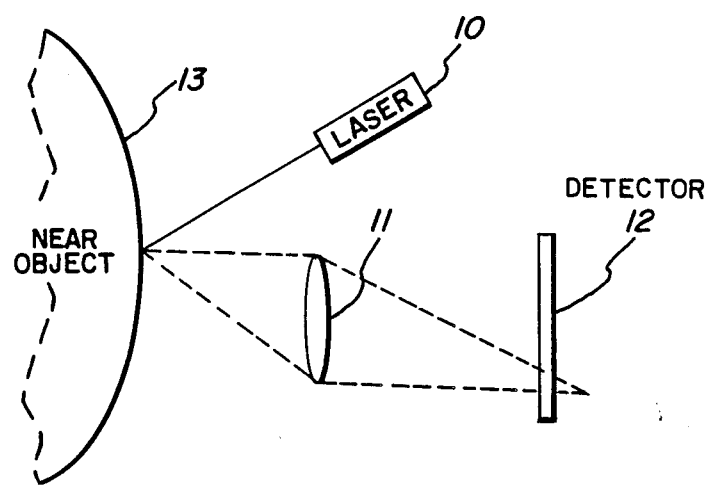
FIGS. 2a and 2b (prior art) illustrate the real behavior of the standard triangulation ranger.
Figure 2B:
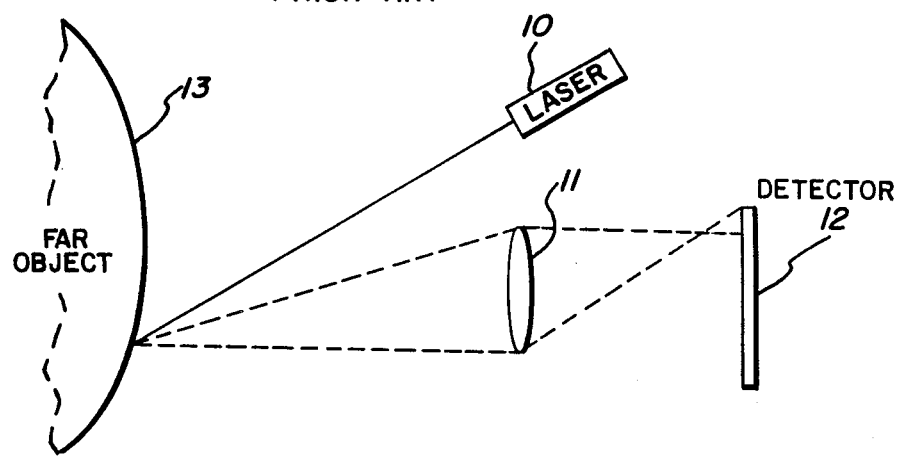
Figure 3A:
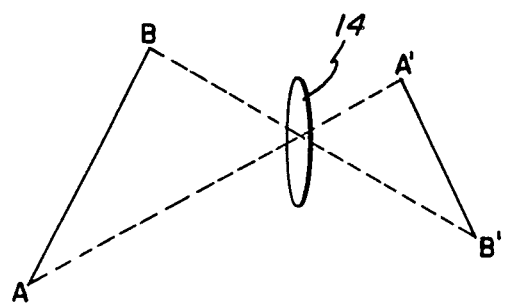
FIGS. 3a and 3b (prior art) show that a line in object space is imaged to a line in image space, and that the relationship of the lines is given by the Scheimpflug condition.
Figure 3B:
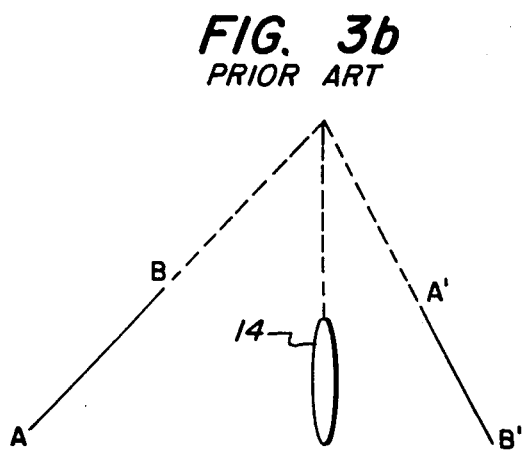

A point ranger capable of making a single range measurement is shown in FIG. 4. In this triangulation ranging system, the imaging lens 15 is at a fixed location relative to a laser 16 and linear detector 17, which are movable and positioned so as to satisfy the Scheimpflug condition and assure that all spots of light reflected from the object 18 are in focus on the detector. The laser beam 19 is at an angle A to the horizontal, the triangulation angle in this configuration. Imaging lens 15 has a focal length f and focal points 20, and the triangulation base B of the system is measured from the center of the lens along a plane axis 21 extending through the lens to the point 22 where the laser beam and plane axis intersect. An image line 23 which extends longitudinally through the photodetector 17 intersects the plane axis 21 and laser beam 19 at the same common point 22, according to the Scheimpflug condition. The standoff distance, depth of field, and range resolution at a point within the depth of field are calculatable functions of the triangulation angle, triangulation base, lens focal length, detector length and effective granularity, and detector position along the image line as shown in FIG. 4. One can select any two of the three system performance measures or parameters and determine what the system geometry must be, given a specific lens and photodetector. This applies to other embodiments of the ranging system in which the light beam emitting component is fixed, and the imaging lens and photodetector components are movable, and the photodetector is at a fixed location and the imaging lens and light beam emitting components are movable.

Depth of field is the range of distances over which a system can provide satisfactory definition. Standoff distance in the context of this invention is defined as the distance from a reference on the camera, such as the center of the lens in FIG. 4, to the closest object surface that can be measured. Range resolution refers to the resolution at some given point within the depth of field. For the single point ranger shown in FIG. 4, the position of the lower end of detector 17 dictates what the standoff distance is, the position of the upper end of detector 17 dictates the maximum range value, and the distance between the minimum and maximum range values is the depth of field. The range resolution then takes monotonically varying values within the depth of field based on the number of pixel elements in the detector and its length. Range resolution is not constant over the entire depth of field, but is finer for the near field than for the far field. As the detector become more vertical, the resolution is increasingly finer and the depth of field is smaller. The relationship and interaction between these three performance parameters will be understood by those skilled in the art.

Figure 5:
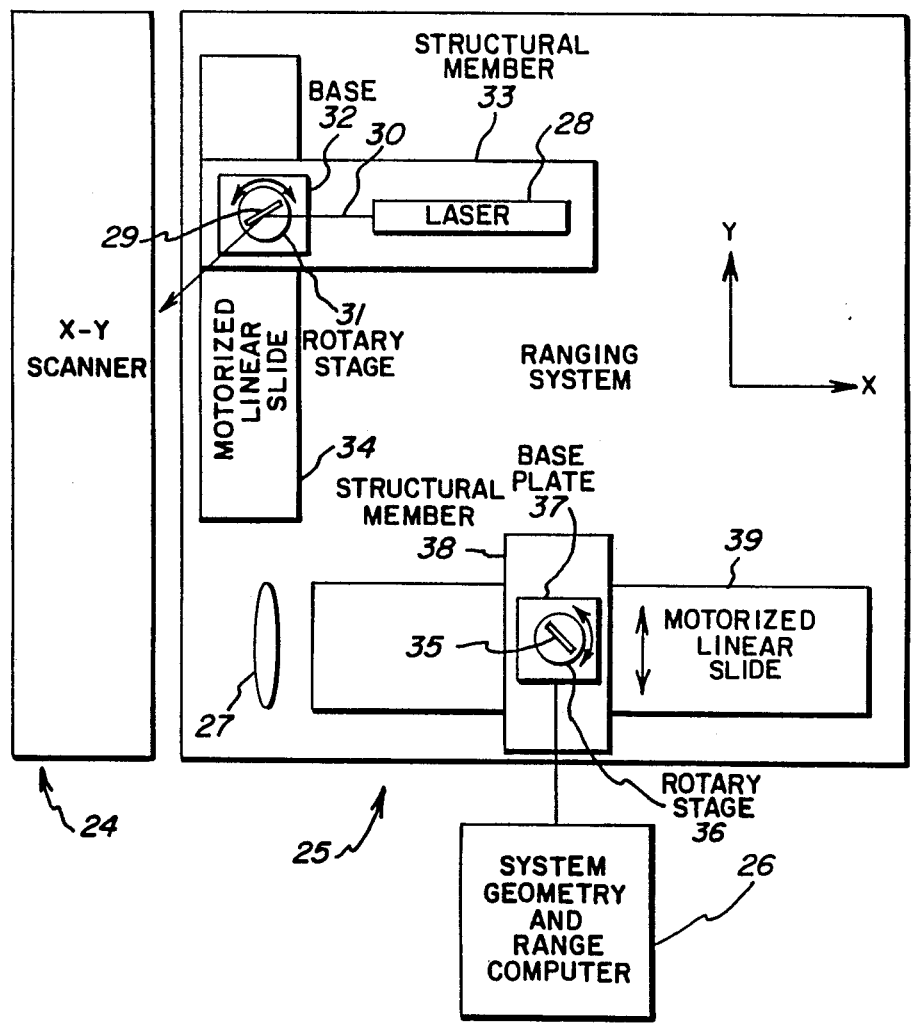
FIG. 5 is a schematic plan view and block diagram of a first embodiment of the variable depth range camera.

The variable depth range camera in FIG. 5 is reconfigurable in real time and is a system that allows for continuously variable standoff distance, depth of field and range resolution without requiring the replacement of physical parts. A scanner 24 is typically placed in front of the variable depth triangulation ranging system 25 to direct the light ray and viewing axis in any random direction for random target range acquisition or, when the light ray is scanned over an area, full fields of data may be obtained. A system geometry and range computer 26 does the necessary computations including the calculation of range from received photodetector signals. Algorithms are provided for determining system geometry given the performance requirements, lens focal length and detector resolution.

An imaging lens 27 is mounted at a fixed location on the base of the device. The imaging lens component may be, instead of a single lens, a lens system having an effective plane axis. The light beam emitting assembly is comprised of a laser 28 and a variable orientation mirror 29 for changing the triangulation angle of the laser beam 30. Mirror 29 is vertical as seen from this top view and is on a rotary stage 31. Laser 28 and a base 32 for the rotary stage are mounted on a structural member 33 which is in turn supported on a motorized linear slide 34. Movement of the light beam emitting assembly in the Y direction adjusts the triangulation base of the system. An X,Y,θ stage arrangement is provided for adjustably positioning the photodetector 35, which may be a lateral effect photodiode, a linear array, line scan sensor, or a lateral effect photomultiplier and the associated electronics. The detector is on a rotary stage 36 that is supported on a base plate 37. A structural member 38 carries this assembly and has linear movement in the Y direction, and is mounted on a motorized linear slide 39 for X direction movement. Details of the linear and rotary actuators in such a system are not illustrated but are well known to those skilled in the art.

Figure 6A:
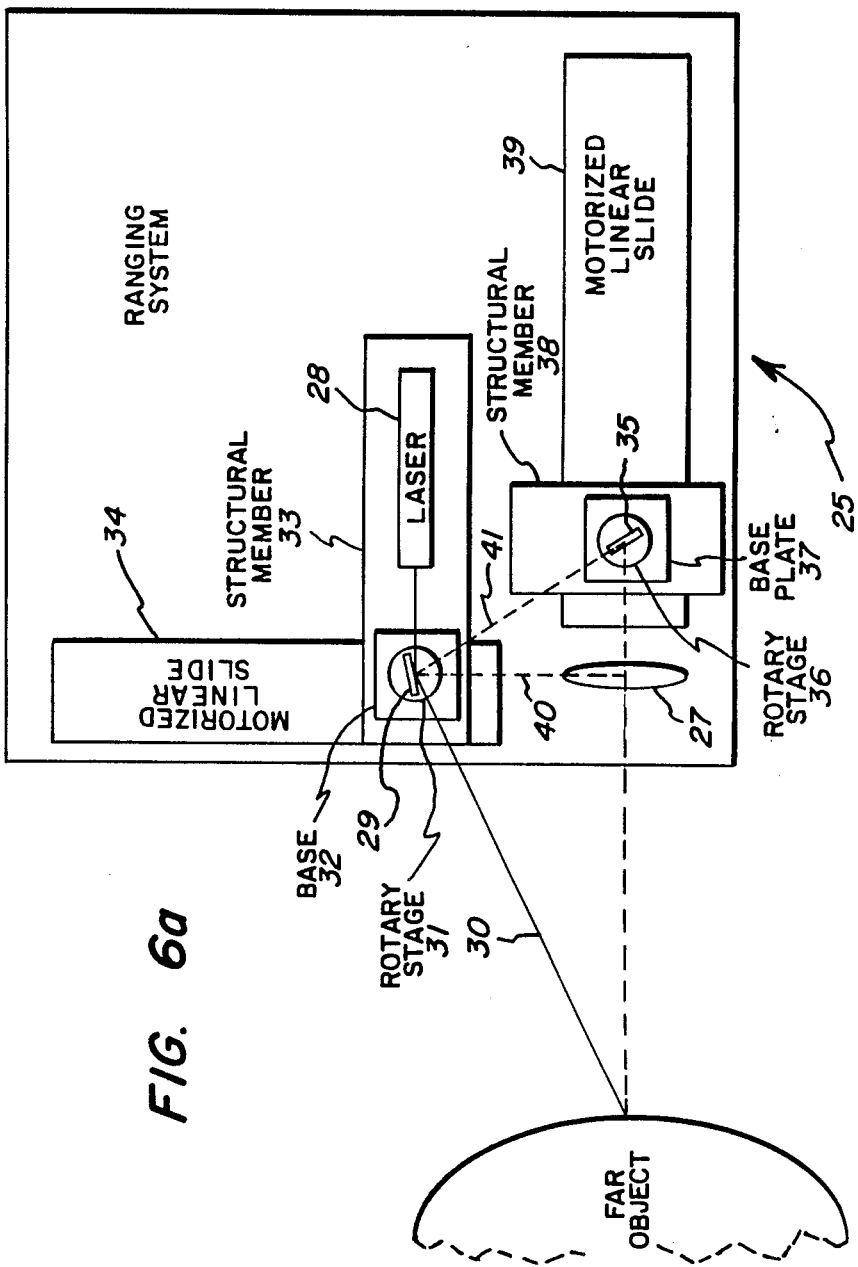
FIGS. 6a and 6b show reconfiguration of the system to measure range to far and near objects.
Figure 6B:
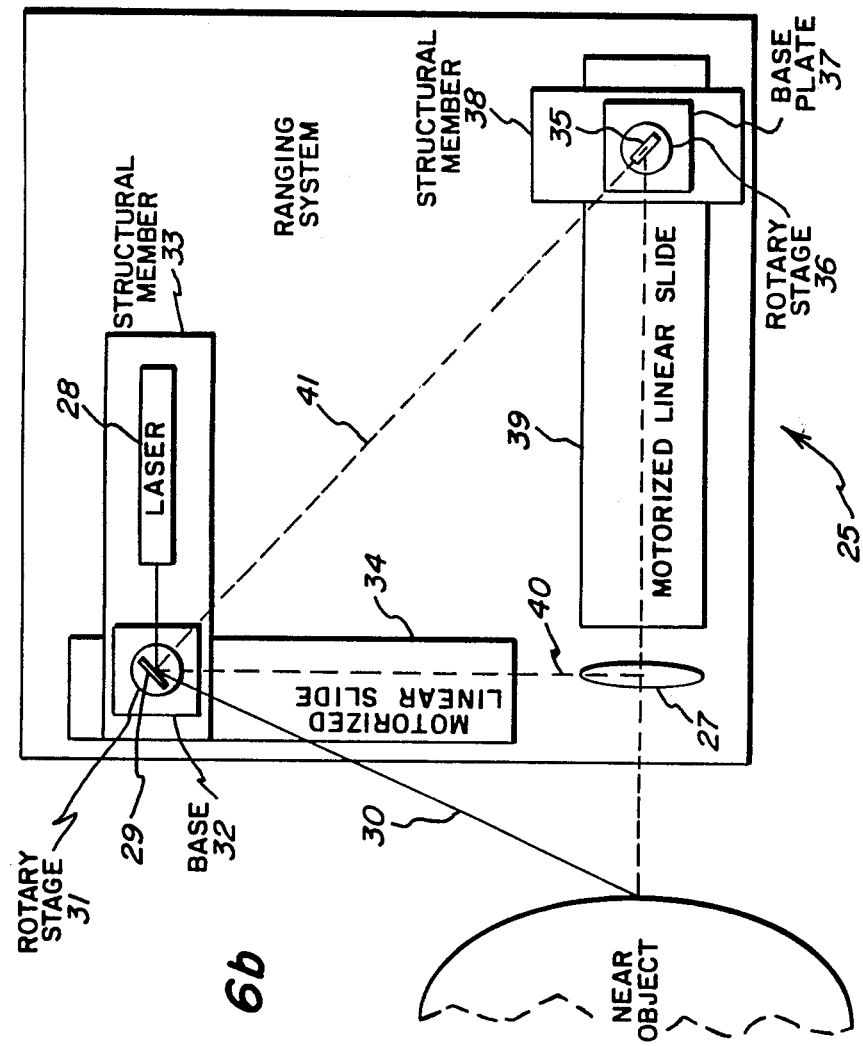

FIGS. 6a and 6b show the variable depth triangulation ranging system 25 in the single-point ranger configuration and how the system geometrically reconfigures itself to provide the requested performance. These figures illustrate that range data can be obtained from an infinite or large depth of field at low resolution, and then very fine resolution data can be obtained at regions of interest simply by varying the geometry of the device. In both configurations the laser beam 30, imaging lens component plane axis 40, and an image line 41 extending longitudinally through the photodetector 35, all intersect at a common point. The system configured as in FIG. 6a acquires range data from a far object with low resolution and a large depth of field. The system triangulation base is small. When reconfigured as illustrated in FIG. 6b to have a large triangulation base and large triangulation angle, the standoff distance is small and range data is acquired from a near object with high range resolution and small depth of field.

Figure 7:
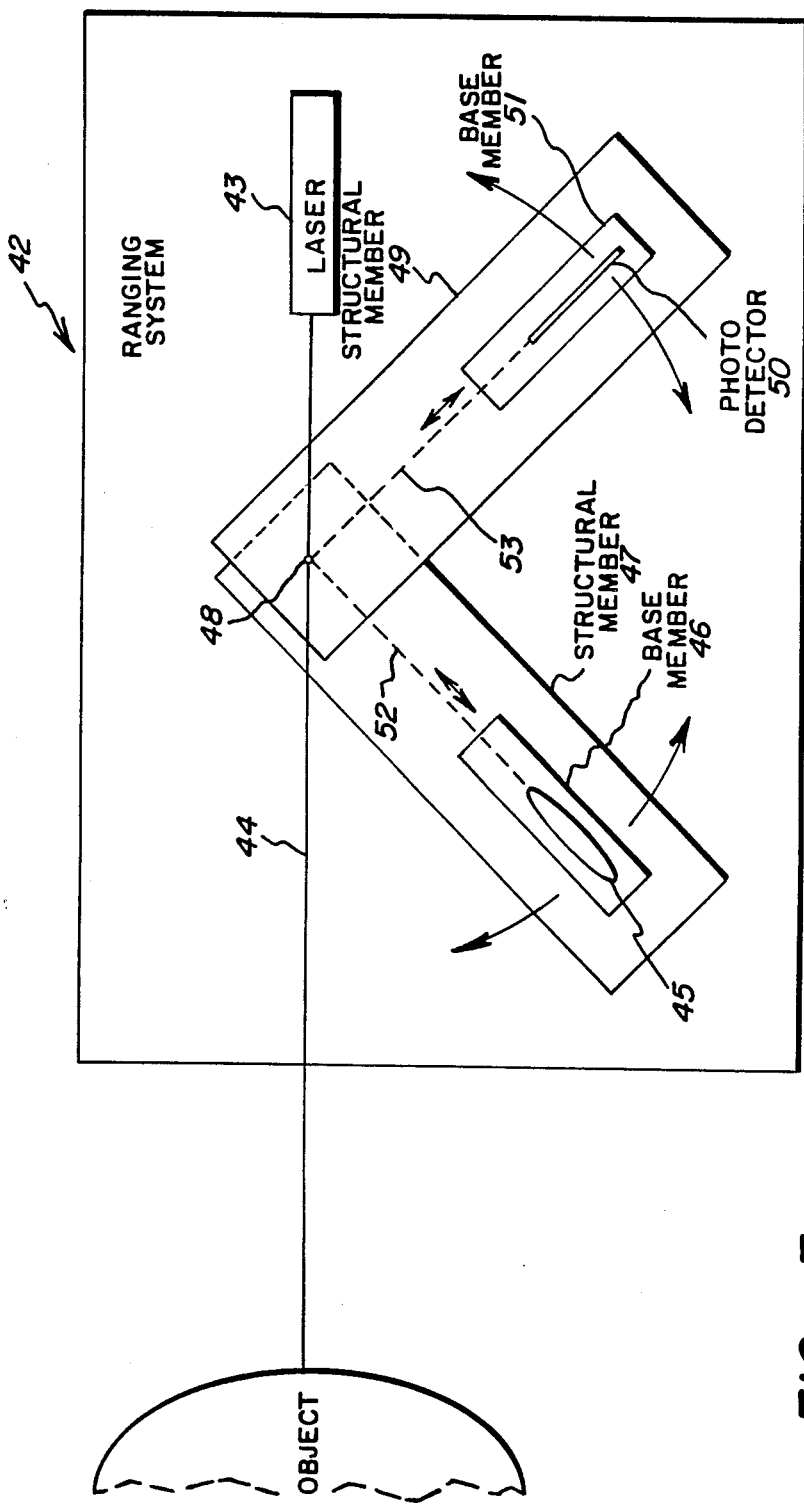
FIG. 7 is a simplified diagram of a second embodiment of the variable depth ranging system having a fixed location light source.

The second embodiment of the variable depth triangulation ranger in FIG. 7 has a stationary light beam emitting component and movable or adjustably positioned imaging lens and photodetector components. In this system 42, the lens component is adjustably mounted to change the angle of the plane axis and its position along the plane axis. The photodetector is adjustably mounted to change the angle of the image line and its position along the image line. A laser 43 generates the laser beam 44 which is directed toward and incident on the object to create a spot of light. An imaging lens 45 is supported on a base member 46 that slides along an elongated structural member 47 which is pivoted at its end using, for example, a pin 48. Linear movement of base 46 along structural member 47 changes the triangulation base of the system. A second elongated structural member 49 carries the photodetector 50 on a slideable base member 51, and is pivoted at one end on pin 48. Pivoting the assemblies 47 and 49 about pin 48 adjusts the triangulation angle. Structural members 47 and 49 are below the level of laser beam 44, and pin 48 is below the intersection of laser beam 44, plane axis 52, and image line 53, thus satisfying the Scheimpflug condition. Rotating structural member 49 about pin 48 adjusts the angle of the image line, and linear movement of base member 51 along the structural member changes the position of the photodetector along the image line.

Figure 8:
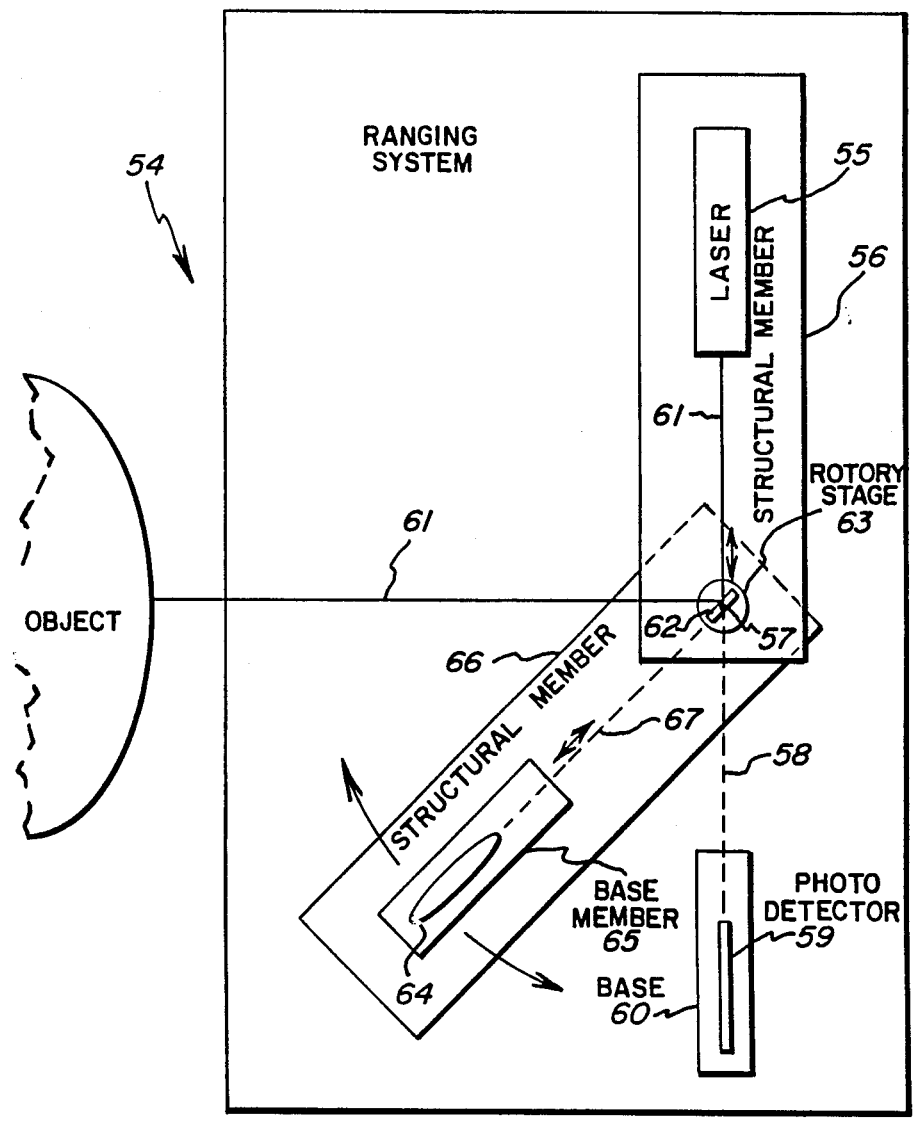
FIG. 8 is a simplified diagram of a third embodiment of the system having a fixed location photodetector.

The third embodiment of the variable depth triangulation ranger shown in FIG. 8 has a stationary photodetector and adjustably mounted light beam emitting and imaging lens components. In system 54, the light beam emitting component is adjustable to change the angle of the laser beam and the distance from the photodetector of the intersection point of the laser beam with the image line. The imaging lens component is movably mounted to change the angle of the plane axis and the position of the imaging lens along the plane axis. A laser 55 is secured to an elongated structural member 56 which pivots about a pin 57. The latter is along the image line 58 extending through linear photodetector 59 which is supported on a base 60. The laser launches the beam 61 along the image line 58 and the beam angle is changed by a variable orientation mirror 62 mounted on a rotary stage 63. Imaging lens 64 is mounted on a base member 65 that slides along an elongated structural member 66 which is pivoted at its end on pin 57, and the latter is at the common intersection of plane axis 67 with light beam 61 and image line 58. Linear movement of base member 65 along structural member 66 changes the triangulation base, and pivoting both the structural member 66 and mirror 62 about pin 57 adjusts the triangulation angle. Pin 57 furthermore has linear movement along image line 58, carrying with it the two structural members 66 and 56 and the imaging lens component and laser beam emitting component.

Another embodiment (not illustrated) would be that all three optical components may be simultaneously movable, with a concomitant increase in system complexity.

FIG. 9 is a diagram of the variable depth range camera showing in greater detail the scanning means 24. Variable depth triangulation ranging system 68 may be any one of the three forms of the single-point ranger shown in FIGS. 5, 7 and 8. Scanner 24 has a set of mirrors to bend the optical plane up and down, and back and forth. The illustrated scanning assembly has two mirrors 69 and 70 to respectively sweep the laser beam 71 in orthogonal directions. Mirror 69 is nearly vertical as seen in this top view and is pivoted about an axis that is perpendicular to the base 72. Pivoting this mirror sweeps the laser beam along one direction to scan along a line on the object. The second mirror 70 is nearly horizontal as seen from the top and pivots about a longitudinal axis to sweep the laser beam in the orthogonal direction. Both mirrors are employed to scan over an area, say by scanning along a line, then in the perpendicular direction for a short distance, and along a line parallel to the first line, and so on.

An actual system operation is typically as follows:

1. The user or a computer determines performance objectives and desired values of two of the following three: standoff distance, depth of field, and range resolution at a point within the depth of field.

2. The computer performs calculations to determine if the objectives can be met.

3. If these objectives can be met or exceeded, computer 26 calculates the required optimal system geometry, given prior information about lens focal length, detector sensitive length, and effective detector resolution.

4. Linear and rotary actuators in the variable depth triangulation ranging system 68 are positioned to effect the system geometry.

5. Range data are obtained by energizing the laser, operating the scanner assembly 24, and reading the detector. Received photodetector signals are fed to appropriate amplification equipment, conditioned, digitized, and stored.

6. Range values are calculated in computer 26 from the stored data, known system geometry, and appropriate calibration tables.

The variable depth range camera can be used in a variety of environments for many purposes. One metrology application is a precision, non-contact measurement device for inspection of precision airplane engine parts. There are a variety of automated rendezvous and docking applications. This device is useful whenever non-contact range information is required, especially if the information necessitates dynamic system reconfiguration to focus on regions of interest.

While the invention has been particularly shown and described with reference to preferred embodiments thereof, it will be understood by those skilled in the art that the foregoing and other changes in form and details may be made without the parting from the spirit and scope of the invention as defined in the appended claims.

What is claimed is:

1. A variable depth triangulation ranging system comprising:
   a light beam emitting component for generating and directing a light beam toward an object, a linear photodetector component, and an imaging lens component for imaging reflected light onto said linear photodetector component;
   at least two of said components being movable, and means for adjustably positioning said movable components such that the light beam, a plane axis through said imaging lens component, and an image line through said linear photodetector component intersect at approximately a common point and satisfy the Scheimflug condition; and
   means for calculating system geometry and range from received photodetector signals.

2. The ranging system of claim 1 further comprising means to scan said light beam along a line.

3. The ranging system of claim 1 further comprising means to scan said light beam over an area.

4. The ranging system of claim 1 wherein said light beam emitting component comprises a laser.

5. The ranging system of claim 1 wherein said photodetector component is selected from a group consisting of a lateral effect photodiode, a linear array sensor, and a lateral effect photomultiplier.

6. The ranging system of claim 1 wherein a standoff distance is the distance from a reference on said system to a closest target point on said object that can be measured, and a range resolution is the resolution at some target point within said depth of field, the standoff distance and the range resolution being selectable and system geometry being changeable to achieve the selected geometry.

7. The ranging system of claim 1 wherein said imaging lens component is at a fixed location, and said light beam emitting component comprises a laser and a variable orientation mirror to reflect a laser beam and change the system triangulation angle, and said adjustable positioning means comprises means for mounting said laser and mirror for linear movement to change a system triangulation base.

8. The ranging system of claim 7 wherein said adjustable positioning means comprises means for mounting said photodetector component for rotational and linear movement.

9. A variable depth triangulation ranging system comprising:
   a light beam emitting assembly comprising a laser and a variable orientation mirror to reflect a laser beam toward an object at a preselected triangulation angle, and means for adjustably mounting said light beam emitting assembly so that a triangulation base of the system can be adjusted;
   at least one imaging lens mounted at a fixed location for imaging light reflected from the object;
   a linear photodetector, and means for adjustably mounting said photodetector so that an angle of an image line through said linear photodetector and a location of said linear photodetector along the image line can be adjusted;
   means for positioning said light beam emitting assembly and photodetector such that the laser beam, a plane axis through said imaging lens, and the image line intersect approximately at a common point; and
   means for calculating system geometry and range from received photodetector signals.

10. The ranging system of claim 9 further comprising means to scan said laser beam along a line.

11. The ranging system of claim 9 further comprising means to scan said laser beam over an area.

12. The ranging system of claim 9 wherein said linear photodetector is selected from the group consisting of a lateral effect photodiode, a linear array sensor, and a lateral effect photomultiplier.

13. A variable depth triangulation ranging system comprising:
   a light beam emitting component including a laser for generating a laser beam which is directed toward an object, and means for mounting said light beam emitting component at a fixed location;
   an imaging lens component for imaging light reflected off of said object, and means for adjustably mounting said lens component to change an angle of a plane axis of said lens component and a position of said lens component along said plane axis.
   a linear photodetector for detecting imaged light, and means for adjustably mounting said photodetector to change an angle of an image line therethrough and a position of said photodetector along said image line;
   means for positioning said lens component and said photodetector such that the laser beam, the plane axis and the image line intersect approximately at a common point; and
   means for calculating system geometry and range from received photodetector signals.

14. The ranging system of claim 13 further comprising means to scan said laser beam along a line.

15. The ranging system of claim 13 further comprising means to scan said laser beam over an area.

16. The ranging system of claim 13 wherein said linear photodetector is selected from the group consisting of a lateral effect photodiode, a linear array sensor, and a lateral effect multiplier.

17. The ranging system of claim 13 wherein said means for mounting said lens component and photodetector include structural members on which said lens component and photodetector are respectively carried for linear movement, said structural members being both pivoted about said common point.

18. A variable depth triangulation ranging system comprising:
- a linear photodetector through which extends an image line, and means for mounting said photodetector at a fixed location;
- a light beam emitting component including a laser for generating a laser beam for being directed toward an object and means for changing an angle of said laser beam, and means for adjustably mounting said light beam emitting component to change the distance from said photodetector of a common point of intersection of said laser beam and image line;
- an imaging lens component for imaging light reflected off of said object onto said photodetector, and means for adjustably mounting said lens component to change the angle of a plane axis therethrough and the position of said lens component along said plane axis;
- means for positioning said light beam emitting and lens components such that the laser beam, plane axis and image line intersect approximately at said common point, and such that chosen values of any two performance parameters selected from the group consisting of standoff distance, depth of field, and range resolution are obtained by reconfiguring system geometry; and
- means for calculating the system geometry and range from received photodetector signals.

19. The ranging system of claim 18 further comprising means to scan said laser beam along a line.

20. The ranging system of claim 18 further comprising means to scan said laser beam over an area.

21. The ranging system of claim 18 wherein said linear photodetector is selected from a group consisting of a lateral effect photodiode, a linear array sensor, and a lateral effect photomultiplier.

22. The ranging system of claim 18 wherein said means for mounting said light beam emitting component and said imaging lens component include structural members one of which is pivoted at said common point and carries said lens component for linear movement and both of which are movable together along said image line.

* * * * *